US012200738B2

(12) United States Patent
Nilsson et al.

(10) Patent No.: US 12,200,738 B2
(45) Date of Patent: Jan. 14, 2025

(54) METHODS AND NODES FOR UPDATING APERIODIC SRS SLOT OFFSET

(71) Applicant: TELEFONAKTIEBOLAGET LM ERICSSON (PUBL), Stockholm (SE)

(72) Inventors: Andreas Nilsson, Gothenburg (SE); Sven Jacobsson, Västra Frölunda (SE); Helka-Liina Määttänen, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 18/552,764

(22) PCT Filed: Apr. 5, 2022

(86) PCT No.: PCT/IB2022/053178
§ 371 (c)(1),
(2) Date: Sep. 27, 2023

(87) PCT Pub. No.: WO2022/214968
PCT Pub. Date: Oct. 13, 2022

(65) Prior Publication Data
US 2024/0163896 A1    May 16, 2024

Related U.S. Application Data

(60) Provisional application No. 63/171,168, filed on Apr. 6, 2021.

(51) Int. Cl.
*H04W 72/231*    (2023.01)
*H04L 5/00*    (2006.01)
(Continued)

(52) U.S. Cl.
CPC ......... *H04W 72/231* (2023.01); *H04L 5/0051* (2013.01); *H04W 72/0446* (2013.01); *H04W 76/20* (2018.02)

(58) Field of Classification Search
CPC .......... H04W 72/231; H04W 72/0446; H04W 76/20; H04L 5/0051
See application file for complete search history.

(56) References Cited

U.S. PATENT DOCUMENTS

2019/0190669 A1    6/2019   Park

FOREIGN PATENT DOCUMENTS

WO   WO-2020084362 A1 *  4/2020   ......... H04L 27/2613
WO      2022051151 A1     3/2022

OTHER PUBLICATIONS

3GPP TS 38.211 V16.2.0 (Jun. 2020) Technical Specification 3rd Generation Partnership Project;Technical Specification Group Radio Access Network; NR;Physical channels and modulation (Release 16) https://www.3gpp.org/ftp/Specs/archive/38_series/38.211/.

(Continued)

*Primary Examiner* — Melvin C Marcelo
(74) *Attorney, Agent, or Firm* — ERICSSON INC.

(57) ABSTRACT

There is provided a method, in a wireless device, for transmitting a reference signal. The method comprises: receiving a configuration via Radio Resource Control (RRC) from a network node, the configuration comprising a list of slot offset values configured for a Sounding Reference Signal (SRS) resource set; receiving Downlink Control Information (DCI) triggering the SRS resource set, wherein the DCI contains a slot offset bitfield for indicating one of the slot offset values in the list of slot offset values and wherein each entry of the list of slot offset values corresponds to a codepoint of the slot offset bitfield; and transmitting a reference signal using SRS resources configured in the triggered SRS resource set based on the indicated slot offset value.

17 Claims, 8 Drawing Sheets

(51) Int. Cl.
*H04W 72/0446* (2023.01)
*H04W 76/20* (2018.01)

(56) References Cited

OTHER PUBLICATIONS

3GPP TS 38.214 V16.2.0, 3rd Generation Partnership Project; Technical Specification Group Radio Access Network; NR; Physical layer procedures for data (Release 16), Jun. 2020, pp. 1-163, France https://www.3gpp.org/ftp/Specs/archive/38_series/38.214/.
3GPP TS 38.331 V16.1.0 (Jul. 2020), 3rd Generation Partnership Project; Technical Specification Group Radio Access Network; NR; Radio Resource Control (RRC) protocol specification (Release 16) https://www.3gpp.org/ftp/Specs/archive/38_series/38.331/.
3GPP.TS 38.212 V16.2.0, 3rd Generation Partnership Project; Technical Specification Group Radio Access Network; NR; Multiplexing and channel coding, (Release 16), Jun. 2020, (Jun. 2020) https://www.3gpp.org/ftp/Specs/archive/38_series/38.212/.
3Gpp, TS 38.213 v.16.2.0, 3rd Generation Partnership Project; Technical Specification Group Radio Access Network; NR; Physical layer procedures for control (Release 16), Jun. 2020, pp. 1-128, France https://www.3gpp.org/ftp/Specs/archive/38_series/38.213/.
Qualcomm Inc., Discussion on SRS enhancement, 3GPP TSG-RAN WG1 Meeting #104-e, R1-2101451, e-Meeting, Jan. 25-Feb. 5, 2021.
Qualcomm Incorporated, "Discussion on SRS enhancement", 3GPP TSG-RAN WG1 Meeting #103-e, R1-2009255, e-Meeting, Oct. 26-Nov. 13, 2020.
International Search Report for Applicants corresponding PCT Application Serial No. PCT/IB2022/053178 issued on Jun. 17, 2022.

\* cited by examiner

Fig. 6

| | | | | |
|---|---|---|---|---|
| SUL | Serving Cell ID (5 bits) | | BWP ID (2 bits) | Oct 1 |
| slotOffsetId (2bits) | SRS-trigger-state-ID (2bits) | | SRS Resource set ID (4 bits) | Oct 2 |
| slotOffsetId (2bits) | SRS-trigger-state-ID (2bits) | | SRS Resource set ID (4 bits) | |
| slotOffsetId (2bits) | SRS-trigger-state-ID (2bits) | | SRS Resource set ID (4 bits) | ⋮ |
| slotOffsetId (2bits) | SRS-trigger-state-ID (2bits) | | SRS Resource set ID (4 bits) | Oct M |

METHODS AND NODES FOR UPDATING APERIODIC SRS SLOT OFFSET

RELATED APPLICATIONS

The present application claims the benefit of and priority to U.S. Provisional Patent Application Ser. No. 16/171,168, filed Apr. 6, 2021, entitled "MAC CE for updating aperiodic SRS slot offset", the disclosure of which is hereby incorporated herein by reference in its entirety.

TECHNICAL FIELD

The present description generally relates to wireless communication systems and more specifically to handle slot offset for aperiodic sounding reference signals (SRS).

BACKGROUND

The sounding reference signal (SRS) is used in third generation partnership project (3GPP) systems Long Term Evolution (LTE) and New Radio (NR) to provide channel state information (CSI) in the uplink (UL). The application for the SRS is mainly to provide a reference signal to evaluate the channel quality at the gNodeB (gNB) in order to, e.g., derive the appropriate transmission/reception beams or to perform link adaptation (i.e., setting the rank, the modulation and coding scheme (MCS), and the multiple-input multiple-output (MIMO) precoder) for, e.g., physical uplink shared channel (PUSCH) transmission. The signal is, in terms of functionality, similar to the downlink (DL) CSI reference signal (CSI-RS), which provides similar beam management and link adaptation functions in the DL. Note that the SRS can be also used instead of (or in combination with) CSI-RS to acquire DL CSI (by means of reciprocity) for, e.g., enabling physical downlink shared channel (PDSCH) link adaptation.

In LTE and NR, the SRS is configured via radio resource control (RRC) and some parts of the configuration can be updated (for reduced latency) through medium access control (MAC) control element (CE) signaling. The configuration includes, for example, the SRS resource allocation (the physical mapping and sequence to use) as well as the time behavior (aperiodic/semi-persistent/periodic). For aperiodic SRS transmissions, the RRC configuration does not activate an SRS transmission from the user equipment (UE), but instead a dynamic activation trigger is transmitted from the gNB in the DL, via the downlink control information (DCI) in the physical downlink control channel (PDCCH), which instructs the UE to transmit the SRS once, at a predetermined time.

SRS Resource Configuration

The SRS configuration allows generating an SRS transmission pattern based on SRS resource configurations grouped into SRS resource sets. The configuration of each SRS resource in RRC is illustrated in 3GPP 38.331 version 16.1.0

To create the SRS resource on the time-frequency grid with the current RRC configuration, each SRS resource is thus configurable with respect to:

The transmission comb (i.e., mapping to every nth subcarrier, where n=2 or n=4), configured by the RRC parameter transmissionComb, which includes:

i. A comb offset, configured by the RRC parameter comb Offset, is specified (i.e., which of the n combs that should be used).

ii. A cyclic shift, configured by the RRC parameter cychcShift that maps the SRS sequence to the assigned comb, is also specified. The cyclic shift increases the number of SRS resources that can be mapped to a comb, but there is a limit on how many cyclic shifts that can be used (that depends on the transmission comb being used, e.g., 8 for comb 2 and 12 for comb 4).

The time-domain position within a given slot is configured with the RRC parameter resourceMapping, which includes:

i. A time-domain start position, which is limited to be one of the last 6 symbols in a slot, is configured by the RRC parameter startPosition.

ii. A number of orthogonal frequency-division multiplexing (OFDM) symbols for the SRS resource (that can be set to 1, 2 or 4) is configured by the RRC parameter nrofSymbols.

iii. A repetition factor (that can be set to 1, 2 or 4) configured by the RRC parameter repetitionFactor. When this parameter is larger than 1, the same frequency resources are used multiple times across OFDM symbols, used to improve the coverage as more energy is collected by the receiver. It can also be used for beam-management functionality, where the gNB can probe different receive beams for each repetition.

The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol is 4 resource blocks (RBs).

FIG. 1 illustrates a schematic description of how an SRS resource is allocated in time and frequency within a slot (note that semi-persistent/periodic SRS resources typically span several slots), in the case resourceMapping-r16 is not signaled. Note that c-SRS controls the maximum sounding bandwidth, which can be smaller than the maximum transmission bandwidth that the User Equipment (UE) supports. For example, the UE may have capability to transmit over 40 MHz bandwidth, but c-SRS is set to a smaller value corresponding to 5 MHz, thereby focusing the available transmit power to a narrowband transmission which improves the SRS coverage and enables multiplexing of SRS resources (and, hence, UEs) over the 40 MHz bandwidth.

In NR release 16, an additional (and optional) RRC parameter called resourceMapping-r16 was introduced. If resourceMapping-r16 is signaled, the UE shall ignore the RRC parameter resourceMapping. The difference between resourceMapping-r16 and resourceMapping is that the SRS resource (for which the number of OFDM symbols and the repetition factor is still limited to 4) can start in any of the 14 OFDM symbols (see FIG. 2) within a slot, configured by the RRC parameter startPosition-r16. FIG. 2 illustrates another schematic description of how an SRS resource is allocated in time and frequency within a slot if resourceMapping-r16 is signaled.

The RRC parameter resource Type determines whether the SRS resource is transmitted as periodic, aperiodic (single transmission triggered by DCI), or semi persistent (same as periodic except for the start and stop of the periodic transmission that is controlled through Medium Access Control (MAC) Control Element (CE) signaling instead of RRC signaling). The RRC parameter sequenceId specifies how the SRS sequence is initialized and the RRC parameter spatialRelationInfo configures the spatial relation for the SRS beam with respect to another reference signal (RS), which could be another SRS, a synchronization signal block (SSB), or a CSI-RS. If an SRS resource has a spatial relation to another SRS resource, then this SRS resource should be transmitted with the same beam (i.e., spatial transmit filter) as the indicated SRS resource.

SRS Resource-Set Configuration

The SRS resource will be transmitted as part of an SRS resource set. Note that all resources in a resource set must share the same resource type. Within an SRS resource set, the following parameters (common to all SRS resources in the set) are configured in RRC:
  The associated CSI-RS resource (this configuration is only applicable for non-codebook-based UL transmission) for each of the possible resource types (aperiodic, periodic and semi persistent).
    i. For an aperiodic SRS, the associated CSI-RS resource is set by the RRC parameter csi-RS.
    ii. For semi-persistent/periodic SRS, the associated CSI-RS resource is set by the RRC parameter associatedCSl-RS.
  For aperiodic SRS, the slot offset is configured by the RRC parameter slotOffset and sets the delay from the PDCCH trigger reception to the start of the SRS transmission (measured in slots).
  The resource usage, which is configured by the RRC parameter usage sets the constraints and assumption on the resource properties (see e.g. 3GPP 38.331 version 16.1.0 and 3GPP 38.214 for the details).
  The power-control RRC parameters alpha, p0, pathloss-ReferenceRS (indicating the DL RS that is used for path-loss estimation), srs-PowerControlAdjustment-States, and pathlossReferenceRSList-r16 (for NR release 16), which are used for determining the SRS transmit power (see 3GPP 38.213 for the details).
Each SRS resource set is configured as illustrated in 3GPP 38.331 version 16.1.0.

To summarize, the SRS resource-set configuration determines, e.g., usage, power control, aperiodic transmission timing, and CSI-RS resource association. The SRS resource configuration, on the other hand, determines the time-and-frequency allocation, the periodicity and offset of each resource, the sequence ID for each resource and the spatial-relation information.

Dynamic Indication of Slot Offset for Aperiodic SRS

In the ongoing standardization work for NR Rel-17, for enhanced DCI triggering flexibility, it has been agreed to introduce the option to indicate dynamically the slot offset for aperiodic SRS in the DCI triggering of SRS resource set(s). The new slot offset will be determined based on a new parameter, hereinafter referred to as t, which indicates the number of slots between a reference slot (reference slot will either be the slot containing the DCI triggering the SRS or the slot indicated by the legacy slot offset parameter) and the slot where the SRS should be transmitted. The following was agreed during the RAN1#103-e meeting:

A given aperiodic SRS resource set is transmitted in the (t+1)th available slot counting from a reference slot, where t is indicated from DCI, or RRC (if only one value oft is configured in RRC), and the candidate values oft at least include 0. Adopt at least one of the following options for the reference slot.
  Opt. 1: Reference slot is the slot with the triggering DCI.
  Opt. 2: Reference slot is the slot indicated by the legacy triggering offset.
    FFS the detailed definition of "available slot" considering UE processing complexity and timeline to determine available slot, potential co-existence with collision handling, etc., e.g.,
      Based on only RRC configuration, "available slot" is the slot satisfying: there are UL or flexible symbol(s) for the time-domain location(s) for all the SRS resources in the resource set and it satisfies the minimum timing requirement between triggering PDCCH and all the SRS resources in the resource set.
    FFS explicit or implicit indication oft.
    FFS whether updating candidate triggering offsets in MAC CE may be beneficial.

As shown in this agreement, two different options are considered on how to indicate the t values for a triggered aperiodic SRS resource set, either explicitly or implicitly. For the explicit indication, it is expected that a new DCI field is used to indicate one out of a number of pre-configured t values. While for implicit indication, it is assumed that different t values are associated with different aperiodic SRS trigger states, and by, for example, triggering one SRS resource set with either SRS trigger state 1, 2, or 3, different slot offsets t will be used for that SRS resource set. More detailed descriptions of the implicit and explicit aperiodic SRS slot offset indication can be found https://www.3gpp.org/ftp/tsg_ran/WG1_RL1/TSGR1_103-e/Docs/R1-2009255 zip.

Compared to legacy NR aperiodic SRS slot offset, which count all slots (i.e., DL slots, UL slots and flexible/special slots), the new parameter t only counts the "available slots, which in RAN1#104-e was agreed to be defined as follows: Confirm the following working assumption with modifications. An "available slot" is a slot satisfying that there are UL or flexible symbol(s) for the time-domain location(s) for all the SRS resources in the resource set and it satisfies UE capability on the minimum timing requirement between triggering PDCCH and all the SRS resources in the resource set.
  From the first symbol carrying the SRS request DCI and the last symbol of the triggered SRS resource set, UE does not expect to receive slot format indicator (SFI) indication, UL cancellation indication or dynamic scheduling of DL channel/signal(s) on flexible symbol(s) that may change the determination of "available slot".
  Note: Collision handling between the triggered SRS and any other UL channel/signal is performed after the determination of available slot.
  FFS: Rules to handle the case of multiple SRS resource sets with overlapping symbols and/or triggered by a same DCI.

As can be concluded from the agreement, an "available slot" is a flexible slot or UL slot that contains OFDM symbols that can carry all the time-domain allocations of a triggered SRS resource set (i.e., slots that have sufficiently many UL symbols to support the SRS symbols configured by resourceMapping or resourceMapping-r16 for all SRS resources in the SRS resource set).

SUMMARY

There exist some challenges. Since different SRS resource sets can have different time-domain allocations (depending on which SRS resources that belong to the SRS resource set), which slots that are counted as "available slots" can be different for different SRS resource sets that are triggered by the same DCI. Furthermore, as it is possible to dynamically change the slot format (in order to, e.g. adapt the ratio of DL/UL resources to satisfy the current DL/UL traffic demand), a certain SRS resource-set configuration for which no SRS resources (over all the SRS resource sets triggered by the same DCI) are colliding for a time-division duplex (TDD) slot format, could contain colliding SRS resources after the slot format has dynamically been changed.

In FIG. 3, an example of how changing the slot format could result in a collision between two SRS resource sets is illustrated. Here, SRS resource set 1 contains four single-symbol SRS resources and is configured with t=0, and SRS resource set 2 contains two single-symbol SRS resources and is configured with t=1. Consider the case when these two sets have been configured for the TDD slot format "DDDUUDDDUU". In this case, all UL slots will be counted as "available slots" since all SRS resources for both SRS resource sets can fit into each of the UL slots. Hence, the first SRS resource set, for which t=0, will be transmitted in the first "available slot", which corresponds to the first UL slot after the DCI, while SRS resource set 2, for which t=1, will be transmitted in the second "available slot, which corresponds to the second UL slot after the DCI, and, thus, there are no collisions between any SRS resources in the two SRS resource sets (see the upper part of FIG. 3).

Now, let's assume that the gNB changes the TDD slot format (e.g., to meet new DL traffic demands for example) to "DDDSUDDDSU". Here, S denotes a special slot with 8 DL symbols (OFDM symbol 0-7), 2 switching symbols (OFDM symbol 8-9), and 4 UL symbols (OFDM symbol 10-14). Due to the limited number of UL symbols in the special slot, it will be counted as an" available slot" only for SRS resource set 2, since not all SRS resources in SRS resource set 1 can fit in these UL symbols. Hence, since SRS resource set 1 is configured with t=0 and SRS resource set 2 is configured with t=1, both of these sets will be transmitted in the first UL slot and, thus, there is a collision between SRS resources sets (see the lower part of FIG. 3).

Specifically, there will be a collision between SRS resources 3 and 5, and between SRS resources 4 and 6.

It should be noted that this collision can be avoided if the gNB, after changing the slot format, would instead send the DCI in the special slot (which would result in SRS resource set 1 and 2 being transmitted in the first UL symbol and the second special symbol, respectively). However, this would defeat the main purpose of the introduction of the new flexible aperiodic slot offset (i.e., that the gNB can send the DCI in a more flexible way, as discussed above).

In the current release of NR, there is no rule to define how the UE should behave if it has been configured with colliding SRS resource sets (as in the example above). Therefore, as mentioned in the RAN#104-e agreement, how to handle colliding SRS resource sets is marked as a topic for further study (FFS).

The need for introducing rules to handle colliding SRS resource set will be further exacerbated in NR Rel-17, as SRS resource sets with usage 'antennaSwitching' will be specified for UEs with up to 8 receive antennas. Furthermore, it will be possible to configure one or multiple SRS resource sets for each UE antenna-switching configuration (e.g., for 2T8R, up to 4 SRS resource sets might be allowed), as can be concluded from the agreement below (from RAN#104-e):

For aperiodic antenna switching SRS, support to configure $N \leq N_{max}$ resource sets, where totally K resources are distributed in the N resource sets flexibly based on RRC configuration.

For 1T6R, K=6, $N_{max}$=[4], and each resource has 1 port.
For 1T8R, K=8, $N_{max}$=[4], and each resource has 1 port.
For 2T6R, K=3, $N_{max}$=[3], and each resource has 2 ports.
For 2T8R, K=4, $N_{max}$=[4], and each resource has 2 ports.
Working Assumption: For 4T8R, K=2, $N_{max}$=[2], and each resource has 4 ports.
FFS the number of supported candidate values of N for each xTyR.
FFS extension to increase $N_{max}$ for 1T2R, 1T4R, 2T4R and T=R cases for aperiodic, periodic and semi-persistent SRS resources.
FFS the number of resources and resource sets for semi-persistent and periodic antenna switching SRS.
Note: SRS could be transmitted over the last 6 OFDM symbols, or over any OFDM symbols within the slot subject to UE capability.

To summarize, since the TDD slot format can be changed dynamically by DCI, there is a risk that a certain RRC-based SRS configuration will work for one TDD slot format but not for another. Hence, there is a need to support a more dynamic update of the aperiodic slot offset t by using, e.g. a MAC CE. However, the details of how the MAC CE can be used to update the t value is still an open issue.

This disclosure provides a framework and details for updating the new aperiodic SRS slot offset parameter t using MAC CE signaling, for example.

According to a first aspect, some embodiments include methods performed by a wireless device. For example, the method may comprise: receiving a configuration via RRC from a network node, the configuration comprising a list of slot offset values configured for a SRS resource set; receiving DCI triggering the SRS resource set, wherein the DCI contains a slot offset bitfield for indicating one of the slot offset values in the list of slot offset values and wherein each entry of the list of slot offset values corresponds to a codepoint of the slot offset bitfield; and transmitting a reference signal using SRS resources configured in the triggered SRS resource set based on the indicated slot offset value.

According to a second aspect, some embodiments include methods performed by a network node. The method may comprise: sending a configuration via RRC to a wireless device, the configuration comprising a list of slot offset values, configured for a SRS resource set; sending DCI triggering the SRS resource set, wherein the DCI contains a slot offset bitfield for indicating one of the slot offset values in the list of slot offset values and wherein each entry of the list of slot offset values corresponds to a codepoint of the slot offset bitfield; and receiving a reference signal using SRS resources configured in the triggered SRS resource set based on the indicated slot offset value.

According to a third aspect, some embodiments include a wireless device configured, or operable, to perform one or more functionalities (e.g. actions, operations, steps, etc.) as described herein.

According to a fourth aspect, some embodiments include a network node configured, or operable, to perform one or more functionalities (e.g. actions, operations, steps, etc.) as described herein.

In some embodiments, the wireless device and network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

According to yet another aspect, some embodiments include a non-transitory computer-readable medium storing a computer program product comprising instructions which, upon being executed by processing circuitry (e.g., at least one processor) of the network node or wireless device, configure the processing circuitry to perform one or more functionalities as described herein.

The advantages/technical benefits of the embodiments of the present disclosure are as follows: the embodiments enable dynamic signaling of an aperiodic SRS slot offset, which is useful, for example, when adapting the SRS scheduling to meet new traffic demands or when TDD slot format is changed, and the current aperiodic SRS slot offset values (t values) cause SRS collisions.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIG. 6 illustrates a third example of a MAC CE message, when the update of slot offset t is implicit.

FIG. 7 shows a fourth example of a MAC CE message, when the update of slot offset t is implicit.

FIG. 8 illustrates a fifth example of a MAC CE message, when the update of slot offset t is implicit.

FIG. 9 illustrates a first example of a MAC CE message, when the update of slot offset t is explicit.

DETAILED DESCRIPTION

Figure 1:
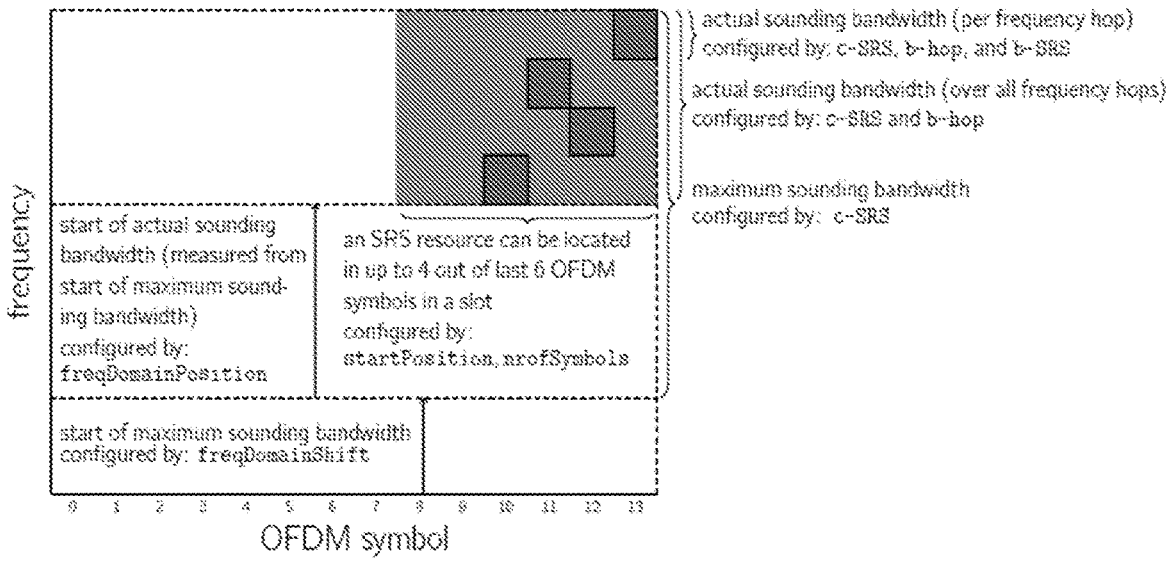
FIG. 1 illustrates an example of a schematic description of how an SRS resource is allocated in time and frequency within a slot if resourceMapping-r16 is not signaled.
Figure 2:
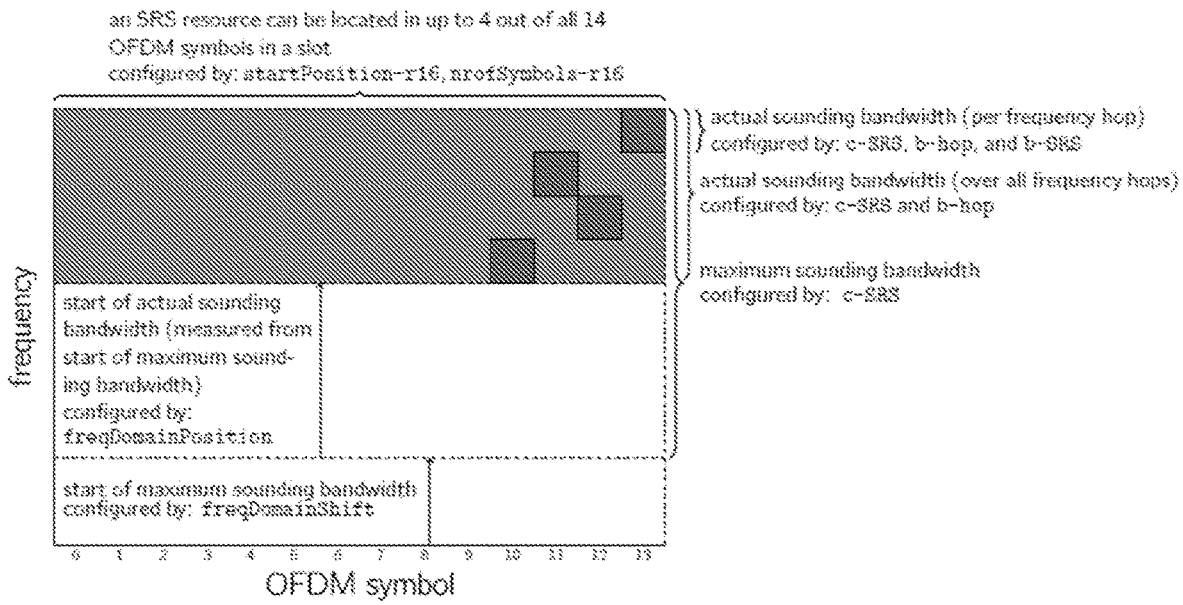
FIG. 2 illustrates another example of a schematic description of how an SRS resource is allocated in time and frequency within a slot if resourceMapping-r16 is signaled.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

System Overview

As described above, there are currently two possible options on how to indicate the slot offset with DCI, either explicitly or implicitly. These two methods require different solutions and, therefore, the embodiments are divided into two bundles, a first bundle of embodiments is related to implicit update of the slot offset, and a second bundle of embodiments is related to the explicit update of the slot offset.

Note that the words/terms "SRS trigger state" and "SRS trigger state ID" are used in the disclosure, however, there is no explicit RRC configuration of such parameters. Instead, these terms refer to the codepoints (01, 10 & 11) used to trigger aperiodic SRS resource set(s) as specified in 3GPP 38.212 Table 7.3.1.1.2-24: "SRS request". This means, for example, that when the disclosure refers to "SRS trigger state 1" or "SRS trigger state ID 1", it actually refers to the codepoint "01" of the SRS request field as specified in 3GPP 38.212-Table 7.3.1.1.2-24. When the terms "SRS trigger state 2" or "SRS trigger state ID 2" are used, they refer to the codepoint "10" of the SRS request field as specified in 3GPP 38.212-Table 7.3.1.1.2-24, and so on.

Examples Related to Implicit Update of the Slot Offset t

Embodiment 1

In this embodiment, each SRS resource set is RRC configured with a list of N t-values (as schematically illustrated in a data structure of Table 1 below in the srs-ResourceSetId) and where each entry of the list is implicitly associated with an SRS trigger state (e.g., the first entry in the list is associated with SRS trigger state 1, the second entry in the list is associated with SRS trigger state 2 and so on). Assume that a UE is configured with the following t-values of the list slotOffsetList-r17: [0, 1, 4]. This would mean that if this SRS resource set is triggered with SRS trigger state 1, the UE should apply t=0, if the SRS resource set is triggered with SRS trigger state 2, then the UE should apply the t=1, and if the SRS resource set is triggered with SRS trigger state 3, then the UE should apply t=4.

TABLE 1

(Data structure of a SRS resource set)

```
SRS-ResourceSet ::=          SEQUENCE {
    srs-ResourceSetId        SRS-ResourceSetId,
    srs-ResourceIdList       SEQUENCE (SIZE(1..maxNrofSRS-ResourcesPerSet)) OF SRS-ResourceId
OPTIONAL, -- Cond Setup
    resourceType             CHOICE {
        aperiodic            SEQUENCE {
            aperiodicSRS-ResourceTrigger    INTEGER (1..maxNrofSRS-TriggerStates-1),
            csi-RS                          NZP-CSI-RS-ResourceId          OPTIONAL, -- Cond
NonCodebook
            slotOffset                      INTEGER (1..32)                OPTIONAL, -- Need S
            ...,
            [[
            aperiodicSRS-ResourceTriggerList       SEQUENCE (SIZE(1..maxNrofSRS-TriggerStates-2))
                                                   OF INTEGER (1..maxNrofSRS-TriggerStates-1)      OPTIONAL -- Need M
            ]]
               slotOffsetList-r17           SEQUENCE (SIZE (1..maxNrofSRS-TriggerStates-1))
of t-values
        },
        semi-persistent      SEQUENCE {
            associatedCSI-RS             NZP-CSI-RS-ResourceId          OPTIONAL, -- Cond
NonCodebook
            ...
        },
        periodic             SEQUENCE {
            associatedCSI-RS             NZP-CSI-RS-ResourceId          OPTIONAL, -- Cond
NonCodebook
            ...
        }
    },
    usage                    ENUMERATED {beamManagement, codebook, nonCodebook, antennaSwitching},
    [...]
```

Figures 3, 4, 5:
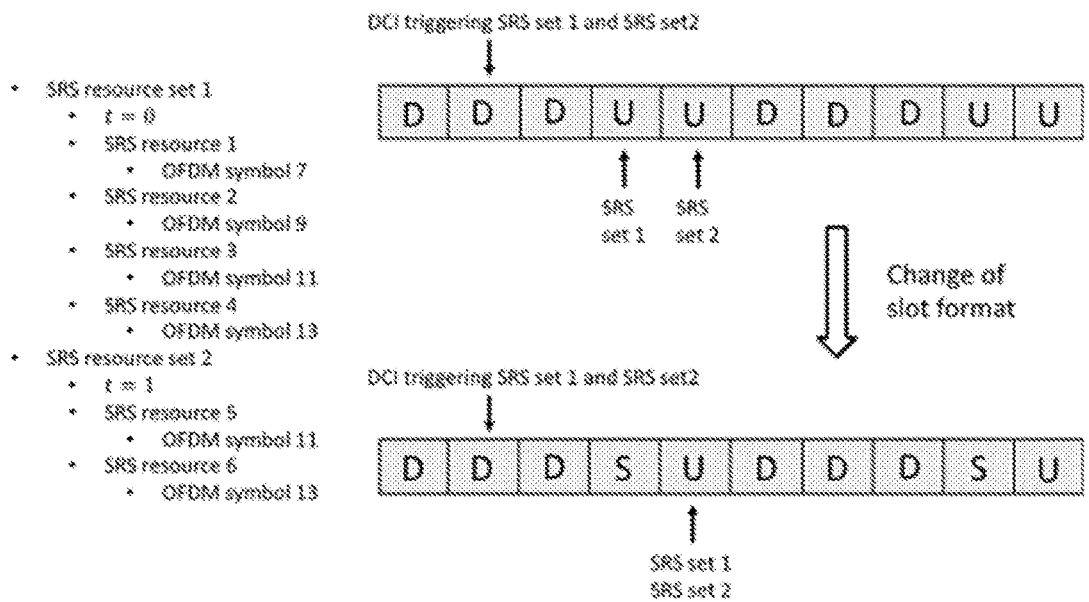
FIG. 3 illustrates an example of how SRS resource sets could be colliding after a dynamic update of the slot format.
FIG. 4 shows a first example of a MAC CE message, when the update of slot offset t is implicit.
FIG. 5 illustrates a second example of a MAC CE message, when the update of slot offset t is implicit.

FIG. 4 illustrates one example of a MAC-CE message for this embodiment. The length of this MAC CE message can be fixed and correspond to the number of configured SRS resources sets, or the length can be adaptable. In case it is adaptable, an extra field is needed to indicate the number of SRS resource set IDs that should be updated, or the UE can determine the number of SRS resource set IDs and corresponding associated t-values and "SRS trigger-state-IDs" based on the length field included in the MAC CE header. The MAC CE contains the following fields:

SUL: This field indicates whether the MAC CE applies to the normal UL (NUL) carrier or supplementary UL (SUL) carrier configuration. This field is set to 1 to indicate that it applies to the SUL carrier configuration, and it is set to 0 to indicate that it applies to the NUL carrier configuration.

Serving Cell ID: This field indicates the identity of the Serving Cell for which the MAC CE applies. The length of the field is 5 bits.

BWP ID: This field contains the ID corresponding to a downlink bandwidth part (BWP) for which the MAC CE applies. The BWP ID is given by the higher-layer parameter BWP-Id as specified in 3GPP TS 38.331. The length of the BWP ID field is 2 bits since a UE can be configured with up to 4 BWPs for DL.

SRS Resource set ID: Contains the higher layer parameter srs-ResourceSetId as specified in 3GPP TS 38.331. The length of the SRS resource Set ID field is 4 bits since 16 SRS resource sets can be configured per BWP.

SRS-trigger-state-ID: Indicates which SRS trigger state that the update t values are linked to, which implicitly indicates which entry in the list slotOffsetList-r17 that should be updated.

t-value: Indicates a new value for t for the indicated SRS trigger state.

When a UE receives a MAC CE of FIG. 4, the UE can determine that for an indicated/associated SRS resource set, a new value of time offset should be used for a certain SRS trigger state. As such, if this SRS trigger state is indicated, the UE can transmit the reference signal based on the new and updated time offset (or timing) associated with that SRS trigger state, and thus can avoid some potential collisions, for example.

FIG. 5 illustrates another example of a MAC CE message for this embodiment. The length of this MAC CE message can be fixed and correspond to the number of configured SRS resources sets, or the length can be adaptable. In case it is adaptable, an extra field is needed to indicate the number of SRS resource set IDs that should be updated, or the UE understands the number of SRS resource set IDs and corresponding associated t-values based on the length field included in the MAC CE header. The main difference between this MAC CE message and the previous MAC CE message (of FIG. 4) is that, here, there is no explicit indication of which SRS trigger state that an indicated t-value should be updated for. Instead, an implicit mapping is used, as is exemplified by the arrows in FIG. 5. Since there are only three SRS trigger states, three t-values should be indicated per SRS resource set. For example, the location of the field indicating the t-value in the MAC CE provides the SRS trigger state associated with that t-value. As one example, the field for the t-value in the second octet (Oct 2) is associated with SRS trigger state 1, the first field for the t-value in the third octet (Oct 3) is associated with SRS trigger state 3 and the second field for the t-value in the third octet (Oct 3) is associated with SRS trigger state 2. Also, the UE considers the MAC CE in blocks of 2 octets. For example, Oct 2 and Oct 3 are associated with the SRS Resource ID #1, Oct 4 and Oct 5 are associated with SRS Resource ID #2, and so on. One benefit with this MAC CE message is that 4 bits can be used to indicate the t-values which increases the range of the candidate t-values.

In one variant of this embodiment, as illustrated in FIG. 6, only 3 bits can be used to indicate the t values (i.e. the "t-value bitfield" only consists of 3 bits instead of 4 bits), which means that there will be one or two spare bits per octave/octet (depending on if there are one or two "t-value bitfields" in that octave/octet), and these additional spare bits could be used for other things and/or reserved for later use.

In one example, the additional bit (C field) in second octet (Oct 2) can indicate to the UE what to do with the next octet. For instance, if C is set to 0 (zero), the next octet (e.g. Oct 3) is omitted, and the UE only updates the t-value associated with SRS trigger state 1. The 2 additional bits (e.g. D fields) in the third octet (e.g. Oct 3) can indicate to the UE what to do with some fields. For instance, if D is set to 0, the UE should ignore the bits of the t-value bitfield right before it. As such, the UE can ignore the t-value associated with SRS trigger state 1 or with SRS trigger state 3. It should be appreciated that other uses of the additional bits can be considered.

In another example, the octet right after the SRS resource ID octet can contain two t-value fields and two bits of the third t-value field. The third bit of the t-value field is in the same octet as the SRS Resource set ID. This octet therefore has three bits to be used for other uses. For example, it may be specified that the first extra bit in the octet where the SRS Resource ID is indicates whether this octet follows with another octet or not. If not, e.g. the extra bit is set to the value of "0", the rest of the bits are used for one t-value field, which is then the only one present for the SRS Resource ID field. If it is set to the value of "1", it can indicate that there is another octet with more t-value fields. Then, in this particular case, the next bit in the same octet as the SRS Resource ID field can indicate whether the UE expects one or two t-value field in the follow up octet.

When the UE receives a MAC CE of FIG. 5 or 6, the UE can determine that for a given SRS resource set, a t-value associated with a particular SRS trigger state has been updated.

If that SRS trigger state is indicated, then, the UE transmits the reference signal based on the updated t-value associated with that SRS trigger state.

Embodiment 2

In this embodiment, a t-value is RRC configured in a new field, which in this example will be called slotOffset-r17, and a MAC CE message is used to associate slotOffset-r17 (and, hence, associate a t-value) for a given SRS resource set and SRS trigger state, as schematically illustrated in a data structure of Table 2 below.

TABLE 2

(Data structure of a SRS Configuration)

```
-- ASN1START
-- TAG-SRS-CONFIG-START
SRS-Config ::=            SEQUENCE {
   srs-ResourceSetToReleaseList      SEQUENCE (SIZE(1..maxNrofSRS-ResourceSets)) OF SRS-
ResourceSetId          OPTIONAL,   -- Need N
   srs-ResourceSetToAddModList       SEQUENCE (SIZE(1..maxNrofSRS-ResourceSets)) OF SRS-
ResourceSet           OPTIONAL  -- Need N
   srs-ResourceToReleaseList         SEQUENCE (SIZE(1..maxNrofSRS-Resources)) OF SRS-ResourceId
OPTIONAL,   -- Need N
   srs-ResourceToAddModList          SEQUENCE (SIZE(1..maxNrofSRS-Resources)) OF SRS-Resource
OPTIONAL,  -- Need N
   tpc-Accumulation           ENUMERATED {disabled}                      OPTIONAL,
-- Need S
   ...,
   [[
   [ ... ]
                                                              OPTIONAL, -- Need N
   srs-PosResourceSetToAddModList-r16   SEQUENCE (SIZE(1..maxNrofSRS-PosResourceSets-r16)) OF SRS-
PosResourceSet-r16    OPTIONAL,-- Need N
   srs-PosResourceToReleaseList-r16    SEQUENCE (SIZE(1..maxNrofSRS-PosResources-r16)) OF SRS-
PosResourceId-r16      OPTIONAL,-- Need N
   srs-PosResourceToAddModList-r16     SEQUENCE (SIZE(1..maxNrofSRS-PosResources-r16)) OF SRS-
PosResource-r16       OPTIONAL -- Need N
   ]]
}
SlotOffset r-17::=          SEQUENCE {
   slotOffsetId             SlotOffsetId,
   t-value                  integer (1..maxNofCandidate-t-values)    OPTIONAL, -- Need R
}
```

FIG. 7 illustrates one example of a MAC CE message for this embodiment. The length of this MAC CE message can be fixed and correspond to the number of configured SRS resources sets, or the length can be adaptable. In case it is adaptable, an extra field is needed to indicate the number of SRS resource set IDs that should be updated, or the UE can determine the number of SRS resource set IDs and corresponding associated slotoffsetIDs based on the length field included in the MAC CE header. In this MAC CE message, a new field called slotOffsetId is included, which points to one of the RRC configured SlotOffset-r17 fields, and hence will associate a t-value with a SRS trigger state and SRS resource set indicated in the same octave/octet in the MAC CE.

When a UE receives a MAC CE of FIG. 7, the UE can determine that for an indicated/associated SRS resource set, a new value of time offset (given by slotOffsetID) should be used for a certain SRS trigger state. As such, if that SRS trigger state is indicated, the UE can transmit the reference signal based on the new and updated time offset (or timing) associated with that SRS trigger state, and thus can avoid some potential collisions, for example.

FIG. 8 illustrates another example of a MAC CE message for this embodiment. The length of this MAC CE message can be fixed and correspond to the number of configured SRS resources sets, or the length can be adaptable. In case it is adaptable, an extra field is needed to indicate the number of SRS resource set IDs that should be updated, or the UE can determine the number of SRS resource set IDs and corresponding associated slotoffsetIDs based on the length field included in the MAC CE header. The main difference between this MAC CE message (from FIG. 8) and the previous MAC CE message (of FIG. 7) is that here there is no explicit indication of which SRS trigger state that an indicated t-value (via slotoffsetID) should be updated for. Instead, an implicit mapping is used, as is exemplified by the arrows in FIG. 8. Since there are only three SRS trigger states, three t-values should be indicated per SRS resource set. As one example, the field for the slotoffsetID in the second octet (Oct 2) is associated with SRS trigger state 1, the first field for the slotoffsetID in the third octet (Oct 3) is associated with SRS trigger state 3 and the second field for the slotoffsetID in the third octet (Oct 3) is associated with SRS trigger state 2. One benefit with this MAC CE message is that 4 bits can be used to indicate the t-values, which increases the range of the candidate t-values.

In one variant of this embodiment, only 3 bits can be used to indicate the t values (given by the slotOffsetID bitfield, which has 3 bits in this variant instead of 4 bits). This means that there will be one or two spare bits per octave (depending on if there are one or two "slotOffsetID bitfields" in that octave), and these extra spare bits could be used for other things and/or reserved for later use.

In one example, the indication of the additional bits could be similar to the case as illustrated in FIG. 6, with the t-value bitfield being replaced by the slotOffsetID field.

For example, the octet right after the SRS resource ID octet contains two slotOffsetId fields and two bits of the third sloOffsetID field. The third bit of the slotOffset field is in the same octet as the SRS Resource set ID. This octet therefore has then three bits to be used for other uses. For example, it may be specified that the first extra bit in the octet where the SRS Resource ID is indicates whether this octet follows with another octet or not. If not, e.g. the first extra bit is set to value "0", the rest of the bits are used for one slotOffsetId field, which is then the only one present for the SRS Resource field. If it is set the value "1", it indicates that there is another octet with more slotOffsetID fields. Then, in this particular case, the next bit in the same octet as the SRS Resource ID field indicates whether the UE expects one or two slotOffsetID field in the follow up octet.

When the UE receives a MAC CE of FIG. 8, the UE can determine that for a given SRS resource set, a t-value associated with a particular SRS trigger state has been used updated. Then, if that particular trigger state is indicated, the UE transmits the reference signal based on the updated t-value associated with that SRS trigger state, for example. The t-value is given by the slotOffsetID field.

Examples Related to Explicit Update of the Slot Offset t

In these embodiments, a new bitfield in DCI (referred to as "Slot offset bitfield") is used to indicate one out of N preconfigured slot offsets (t-values). The "Slot offset bitfield" in DCI can for example contain 2 or 3 bits in order to indicate a maximum of 4 or 8 t-value candidates. For example, the size of the "Slot offset bitfield" depends on the maximum number of configured t-values for any SRS resource set, and is equal to ceil($\log_2(t_{max})$), where $t_{max}$ is the maximum number of t-value candidates configured for any SRS resource set. So, for example, if the SRS resource set with the highest number of configured t-value candidates has 4 t-value candidates, the number of required bits in "Slot offset bitfield" is 2. If a maximum of one candidate t-values is configured per SRS resource set for all SRS resource sets, the "Slot offset bitfield" can be omitted from the DCI.

Embodiment 3

In this embodiment, each SRS resource set is RRC configured with a list of N t-value candidates given by slotOffsetList-r17 (as illustrated in Table 1) and where each entry of the list is associated with a codepoint of the "Slot offset bitfield" of the DCI (e.g., the first entry in the list is associated to codepoint 0 of "Slot offset bitfield", the second entry in the list is associated with codepoint 1 of "Slot offset bitfield", and so on). Assume that the UE is configured with the following t-values of the list slotOffsetList-r17: [0, 1, 4] for a given SRS resource set. This would mean that if the "Slot offset bitfield" included in the same DCI that is used to trigger that SRS resource set indicates codepoint 0, then the UE should apply t=0, if the "Slot offset bitfield" included in the same DCI that is used to trigger the SRS resource set indicates codepoint 1, then the UE should apply t=1, and if the "Slot offset bitfield" included in the same DCI that is used to trigger the SRS resource set indicates codepoint 3, then the UE should apply t=4.

FIG. 9 illustrates one example of a MAC CE message for this embodiment. The length of this MAC CE message can be fixed and equals the number of configured SRS resources sets, or the length can be adaptable. In case it is adaptable, an extra field is needed to indicate the number of SRS resource set IDs that should be updated, or the UE can determine the number of SRS resource set IDs, and corresponding t-values and DCI-codepoints of "Slot offset bitfield" based on the length field included in the MAC CE header. The field "DCI codepoint" indicates for which codepoint in the "Slot offset bitfield" that the updated t-value should be applied to (and, hence, it implicitly indicates which entry in the list slotOffsetList-r17 that should be updated).

When the UE receives a MAC CE of FIG. 9, the UE can determine that for a given SRS resource set, a timing value/offset (t-value) of a DCI codepoint needs to be updated. To do so, the UE determines the updated timing value (t-value) from the MAC CE; the updated timing value is associated with the DCI codepoint to be updated. Then, the UE transmits the reference signal based on the updated t-value, for example.

Figure 10:
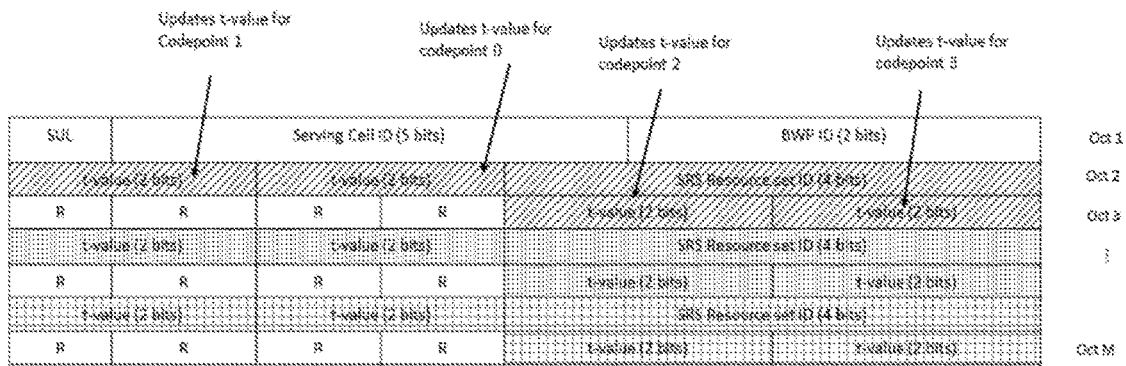
FIG. 10 illustrates a second example of a MAC CE message, when the update of slot offset t is explicit.

FIG. 10 illustrates another example of a MAC CE message for this embodiment. The length of this MAC CE message can be fixed and equals the number of configured SRS resource sets, or the length can be adaptable. In case it is adaptable, an extra field is needed to indicate the number of SRS resource set IDs that should be updated, or the UE can determine the number of SRS resource set IDs and the corresponding t-values based on the length field included in the MAC CE header. The main difference between this MAC CE message (FIG. 10) and the previous MAC-CE message (FIG. 9) is that here there are no explicit indication of which codepoint in the "Slot offset bitfield" that is associated with which t-value. Instead, an implicit mapping is used, as is exemplified by the arrows in FIG. 10 and the different hatched patterns indicate which t-values are associated with which SRS resource sets. For example, the first t-value of Oct 2 (starting from the left) is associated with Codepoint 1, the second t-value of Oct 2 is associated with Codepoint 0. The first t-value of Oct 3 is associated with Codepoint 2 and the second t-value of Oct 3 is associated with Codepoint 3. These 4 t-values are associated with a first SRS Resource Set ID (oblique hatched pattern, for example). The UE processes the MAC CE by blocks of 2 octets. For example, Oct 4 and Oct 5 are associated with a second SRS resource set (vertical only hatched pattern) and so on.

In one variant of this embodiment, the reserved bits (R) can also be used for the t-values, such that an additional two t-values can be indicated per SRS resource set.

When the UE receives a MAC CE of FIG. 10, the UE can determine that for a given SRS resource set, a timing value/offset (t-value) provided by a DCI codepoint needs to be updated. To do so, the UE determines the updated timing value (t-value) from the MAC CE; the updated timing value is associated with the DCI codepoint to be updated. The associated DCI codepoint is given through the location of the t-value field in the MAC CE and octet. Then, the UE transmits the reference signal based on the updated t-value instead of the timing value given by the corresponding DCI codepoint, for example.

Embodiment 4

In this embodiment, a t-value is RRC configured in a new field, which in this example will be called SlotOffset-r17 as illustrated in Table 2 and a MAC CE is used to associate a "SlotOffset-r17" (and hence associate a t-value) for a given SRS resource set and a codepoint in the "Slot offset bitfield".

Figure 11:
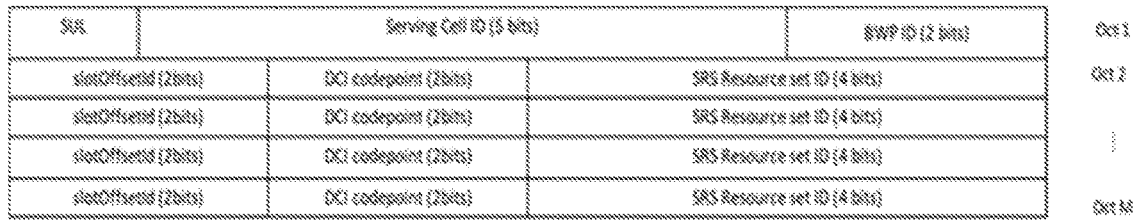
FIG. 11 illustrates a third example of a MAC CE message, when the update of slot offset t is explicit.

FIG. 11 illustrates an example of a MAC CE message for this embodiment. The length of this MAC CE message can be fixed and equals the number of configured SRS resources sets, or the length can be adaptable. In case it is adaptable, an extra field is needed to indicate the number of SRS resource set IDs that should be updated, or the UE can determine the number of SRS resource set IDs and corresponding "slotOffsetIds" and codepoints in the "Slot offset bitfield" based on the length field included in the MAC CE header. In this MAC CE, a new field called slotOffsetId is included, which points to one of the RRC-configured SlotOffset-r17, and hence will associate a t-value with the codepoint in the "Slot offset bitfield" and SRS resource set indicated in the same octave in the MAC CE.

When the UE receives a MAC CE of FIG. 11, the UE can determine that, for a given SRS resource set, a timing value/offset provided by a DCI codepoint needs to be updated. To do so, the UE determines the updated timing value (given by SlotOffsetID) from the MAC CE; the updated timing value is associated with the DCI codepoint to be updated. Then, the UE transmits the reference signal based on the updated timing value instead of the timing value provided by the corresponding DCI codepoint, for example.

Figure 12:
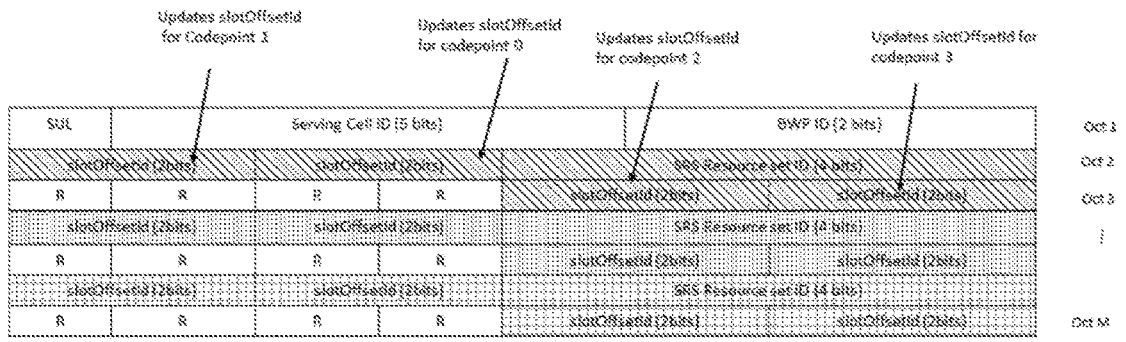
FIG. 12 illustrates a fourth example of a MAC-CE message, when the update of slot offset t is explicit.

FIG. 12 illustrates another example of a MAC-CE message for this embodiment. The length of this MAC CE message can be fixed and equals the number of configured SRS resource sets, or the length can be adaptable. In case it is adaptable, an extra field is needed to indicate the number of SRS resource set IDs that should be updated, or the UE determines the number of SRS resource set IDs and corresponding "slotOffsetIds" based on the length field included in the MAC CE header. The main difference between this MAC CE message (FIG. 12) and the previous MAC-CE message (FIG. 11) is that here there is no explicit indication of which codepoints in the "Slot offset bitfield" is associated with which slotOffsetId. Instead, an implicit mapping is used, as is exemplified by the arrows in FIG. 14 and the different hatched patterns indicate which slotOffsetIds are associated with which SRS resource sets. For example, the first slotOffsetId of Oct 2 (starting from the left) is associated with Codepoint 1, the second slotOffsetId of Oct 2 is associated with Codepoint 0. The first slotOffsetId of Oct 3 is associated with Codepoint 2 and the second slotOffsetId of Oct 3 is associated with Codepoint 3. These 4 slotOffsetId fields are associated with a first SRS Resource Set ID (oblique hatched pattern, for example). The UE processes the MAC CE by blocks of 2 octets. For example, Oct 4 and Oct 5 are associated with a second SRS resource set (vertical only hatched pattern) and so on.

In one variant of this embodiment, the reserved bits (R) can be also used for the slotOffsetIds such that an additional two slotOffsetIds can be indicated per SRS resource set.

When the UE receives a MAC CE of FIG. 12, the UE can determine that for a given SRS resource set, a timing value/offset provided by a DCI codepoint needs to be updated. To do so, the UE determines the updated timing value (given by slotOffsetIds) from the MAC CE; the updated timing value is associated with the DCI codepoint to be updated. The associated DCI codepoint is given through the location of the slotOffsetIds field in the MAC CE and octet. Then, the UE transmits the reference signal based on the updated timing offset, given by slotOffsetIds, instead of the value given by the corresponding DCI codepoint, for example.

Embodiment 5

In this embodiment a t-value is RRC configured in a new field, which in this example will be called SlotOffset-r17, as illustrated in Table 2, and a MAC CE is used to associate a "SlotOffset-r17" (and hence associate a t-value) for a given SRS resource set with a codepoint in the "Slot offset bitfield". Additionally, there may be a list SlotOffsetList-r17 in the abstract Syntax notation one (ASN1) as "SlotOffsetList-r17 SEQUENCE (SIZE(maxNOfcandidateTvalues) SlotOffset-r17)".

Figure 13:
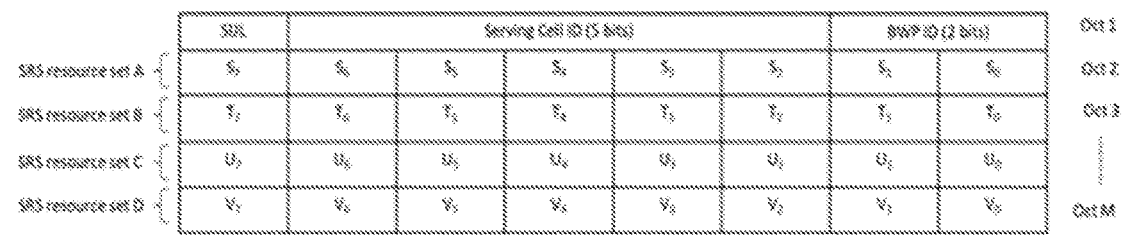
FIG. 13 illustrates a fifth example of a MAC CE message, when the update of slot offset t is explicit.

FIG. 13 illustrates an example of a MAC CE message for this embodiment. The length of this MAC CE message can be fixed and equals the number of configured SRS resource sets, or the length can be adaptable. In case it is adaptable, an extra field is needed to indicate the number of SRS resource set IDs that should be updated, or the UE can determine the number of SRS resource set IDs and corresponding $S_i$ (and potential $U_i$, $V_i$, etc.) values based on the length field included in the MAC CE header. The $S_i$ value corresponds to different variables associated with a first SRS resource set A, the $T_i$ corresponds variables to a second SRS resource set B, and so on.

Below is the description of the variable $S_i$, however the same description is also valid for $T_i$, $U_i$, $V_i$.

The MAC CE comprises:

A variable number of fields $S_i$: If the UE is configured with a "slot offset r17" index with "slot offset r17 ID" i, then the field $S_i$ indicates the activation/deactivation status of the "slot offset r17" with "slot offset r17 ID" i.

If the UE is not configured with a "slot offset r17" with "slot offset r17 ID" i, the MAC entity shall ignore the $S_i$ field.

The $S_i$ field is set to "1" to indicate that the "slot offset r17" with "slot offset r17 ID" i shall be activated and mapped to the codepoint of the DCI "Slot offset" field.

The $S_i$ field is set to "0" to indicate that the "slot offset r17" with "slot offset r17 ID" i shall be deactivated and is not mapped to the codepoint of the DCI "Slot offset" field.

It should be noted that the codepoint to which the "slot offset r17" is mapped is determined by the ordinal position among all the "slot offset r17" with $S_i$ field set to "1". That is: the first "slot offset r17" with $S_i$ field set to "1" shall be mapped to the codepoint value 0 of DCI "Slot offset"-field, the second "slot offset r17" with $S_i$ field set to "1" shall be mapped to the codepoint value 1 of DCI "Slot offset" field, and so on.

An alternative description for the S, T, U V field using T is as follows:

Ti: This field indicates the selection status of the Slot Offset configured within slotOffsetList, as specified in TS 38.331. $T_0$ refers to the first slot offset within the list, $T_1$ to the second one and so on. If the list does not contain an entry with index i, the MAC entity shall ignore the $T_i$ field. The $T_i$ field is set to 1 to indicate that the Slot Offset i shall be mapped to the codepoint of the corresponding DCI field. The codepoint to which the Slot Offset is mapped is determined by its ordinal position among all the Slot Offsets with $T_i$ field set to 1, i.e. the first Slot Offset with $T_i$ field set to 1 shall be mapped to the codepoint value 1, second Slot Offset with $T_i$ field set to 1 shall be mapped to the codepoint value 2 and so on. The maximum number of mapped Slot Offsets is a first number; the maximum number of selected Slot Offsets is a second number.

In one variant of this embodiment, there is a pre-determined mapping between the SRS resource sets A, B, C, etc. in the MAC CE and the RRC configured SRS resource sets with SRS resource set ID 1,2,3, etc., such that SRS resource set A is always associated with SRS resource set ID 1, SRS resource set B is always associated to SRS resource set ID 2 and so on, and if no SRS resource set is configured with for example SRS resource set ID 1, then the UE should ignore the entries for the corresponding octave/octet (Oct 2 in the example) (i.e. the entries of the octave associated with SRS resource set A).

In another variant of this embodiment, the mapping between MAC CE SRS resource set A, B, C, etc. and the RRC configured SRS resource sets with SRS resource set ID 1,2,3, etc. based on the currently RRC configured SRS resource sets and their corresponding SRS resource set IDs. For example, assume that three SRS resource sets are RRC configured with SRS resource set ID=[1,4,9]. Then one can associate the RRC configured SRS resource set with the SRS resource sets in the MAC-CE according to lowest SRS resource set IDs, such that the RRC configured SRS resource set with SRS resource set ID 1, is associated with MAC CE SRS resource set A (i.e. Octave 2 in the example), the RRC configured SRS resource set with SRS resource set ID 4, is associated with MAC CE SRS resource set B (i.e. Octave 3 in the example), and the RRC configured SRS resource set with SRS resource set ID 9, is associated with MAC CE SRS resource set C (i.e. octave 4 in the example).

When the UE receives a MAC CE of FIG. 13, the UE can determine which timing offset (slot offset) is activated or not, with each timing offset associated with a DCI codepoint, a timing value given by slot offset r-17 and a SRS resource set.

Note that, throughout the disclosure, examples for ASN1 code (data structures) and MAC CE design are provided. There may be several other examples that fulfill the same principles and are thus covered by the embodiments.

Figure 14:
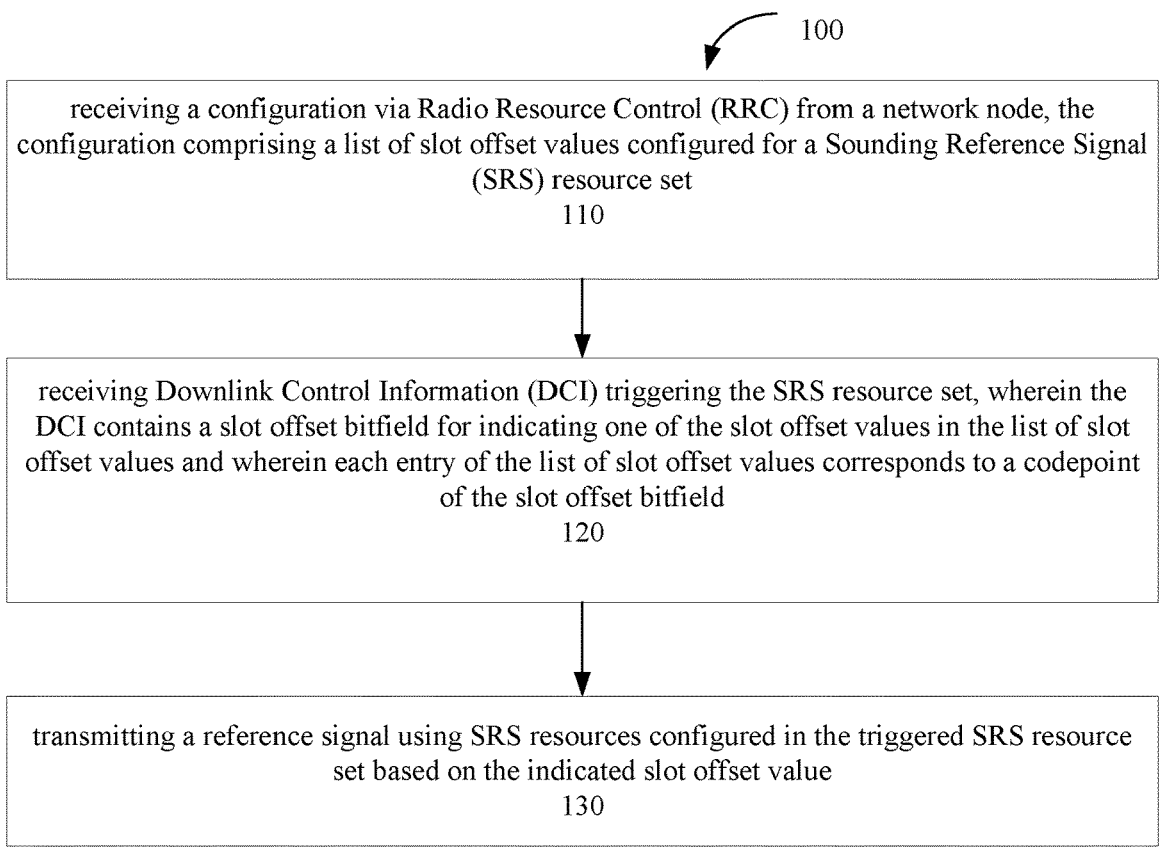
FIG. 14 is a flow chart of a method in a wireless device, according to an embodiment.

FIG. 14 illustrates a flow chart of a method 100 for transmitting a reference signal. The method 100 can be implemented in a wireless device, for example and may comprise:

Step 110: receiving a configuration via RRC from a network node, the configuration comprising a list of slot offset values configured for a SRS resource set; and Step 120: receiving DCI triggering the SRS resource set, wherein the DCI contains a slot offset bitfield for indicating one of the slot offset values in the list of slot offset values and wherein each entry of the list of slot offset values corresponds to a codepoint of the slot offset bitfield;

Step 130: transmitting a reference signal using SRS resources configured in the triggered SRS resource set based on the indicated slot offset value.

In some examples, the size of the slot offset bitfield can depend on a number of slot offset values in the list of slot offset values. For example, the size of the slot offset bitfield can be given by $ceil(log_2(t_{max}))$, where $t_{max}$ is the maximum number of offset values in the configured list of slot offset values.

In some examples, the size of the slot offset bitfield is equal to zero if a single slot offset value is configured in the list of slot offset values.

In some examples, a codepoint 0 of the slot offset bitfield can indicate a first slot offset value of the list of slot offset values, a codepoint 1 of the slot offset bitfield can indicate a second slot offset value of the list of slot offset values, a codepoint 2 of the slot offset bitfield can indicate a third slot offset value of the list of slot offset values and a codepoint 3 of the slot offset bitfield can indicate a fourth slot offset value of the list of slot offset values.

In some examples, the wireless device may receive a MAC CE for updating a slot offset value indicated by the slot offset bitfield in the DCI.

In some examples, upon receipt of the MAC CE, the wireless device may determine an updated slot offset value associated with a codepoint of the slot offset bitfield of the DCI. To do so, in some examples, the wireless device may obtain the updated slot offset value from the MAC CE, which is associated with the codepoint of the slot offset bitfield of the DCI. In other examples, the wireless device may obtain the updated slot offset value from the MAC CE, the updated slot offset value being associated with the codepoint of the slot offset bitfield of the DCI based on a position of the field comprising the updated offset value within the MAC CE.

As a note, the DCI triggering the SRS resource set may mean that the DCI indicates to the UE which SRS resource set to use when transmitting a SRS to the network node.

Figure 15:
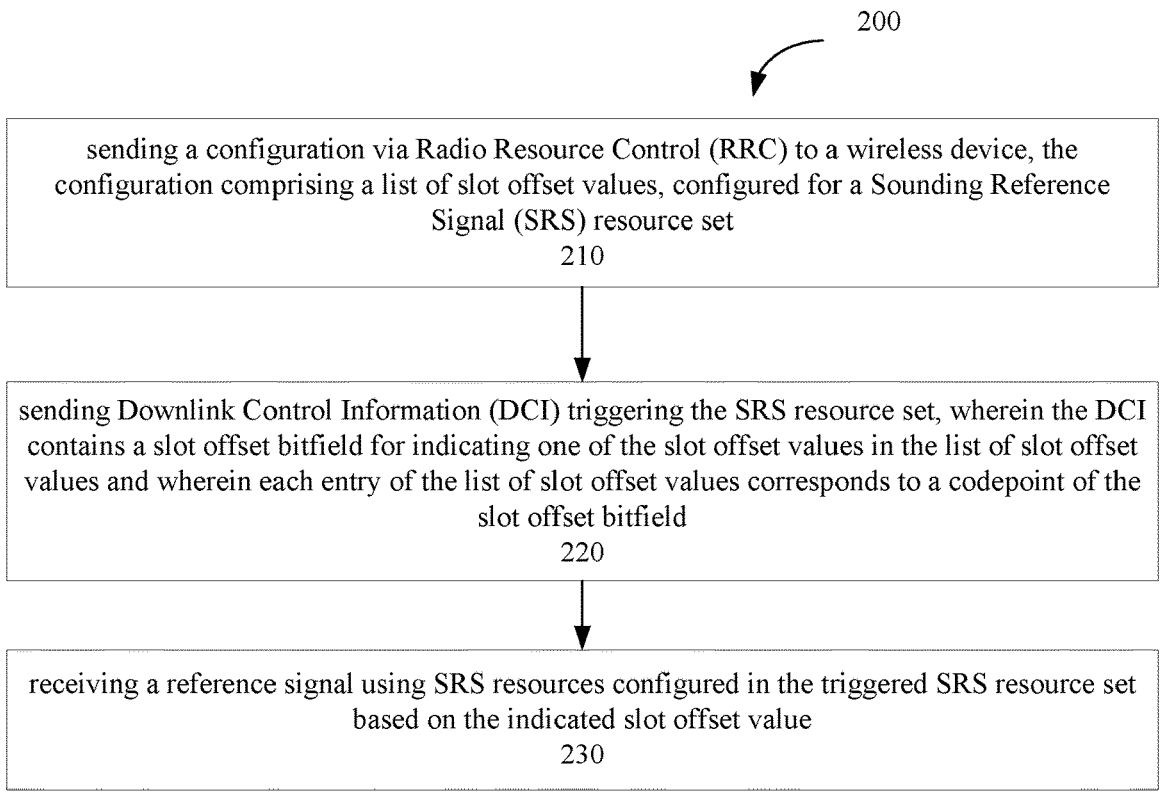
FIG. 15 is a flow chart of a method in a network node, according to an embodiment.

FIG. 15 illustrates a flow chart of a method 200 for receiving a reference signal from a wireless device. The method 200 can be implemented in a network node and may comprise:

Step 210: sending a configuration via RRC to a wireless device, the configuration comprising a list of slot offset values, configured for a SRS resource set;

Step 220: sending DCI triggering the SRS resource set, wherein the DCI contains a slot offset bitfield for indicating one of the slot offset values in the list of slot offset values and wherein each entry of the list of slot offset values corresponds to a codepoint of the slot offset bitfield;

Step 230: receiving a reference signal using SRS resources configured in the triggered SRS resource set based on the indicated slot offset value.

In some examples, the size of the slot offset bitfield may depend on a number of slot offset values in the list of slot offset values. For example, the size of the slot offset bitfield can be given by $ceil(log_2(t_{max}))$, where $t_{max}$ is the maximum number of offset values in the configured list of slot offset values.

In some examples, the size of the slot offset bitfield is equal to zero if a single slot offset value is configured in the list of slot offset values.

In some examples, a codepoint 0 of the slot offset bitfield can indicate a first slot offset value of the list of slot offset values, a codepoint 1 of the slot offset bitfield can indicate a second slot offset value of the list of slot offset values, a codepoint 2 of the slot offset bitfield can indicate a third slot offset value of the list of slot offset values and a codepoint 3 of the slot offset bitfield can indicate a fourth slot offset value of the list of slot offset values.

In some examples, the network node can send a MAC CE for updating a slot offset value indicated by the slot offset bitfield in the DCI.

Figure 16:
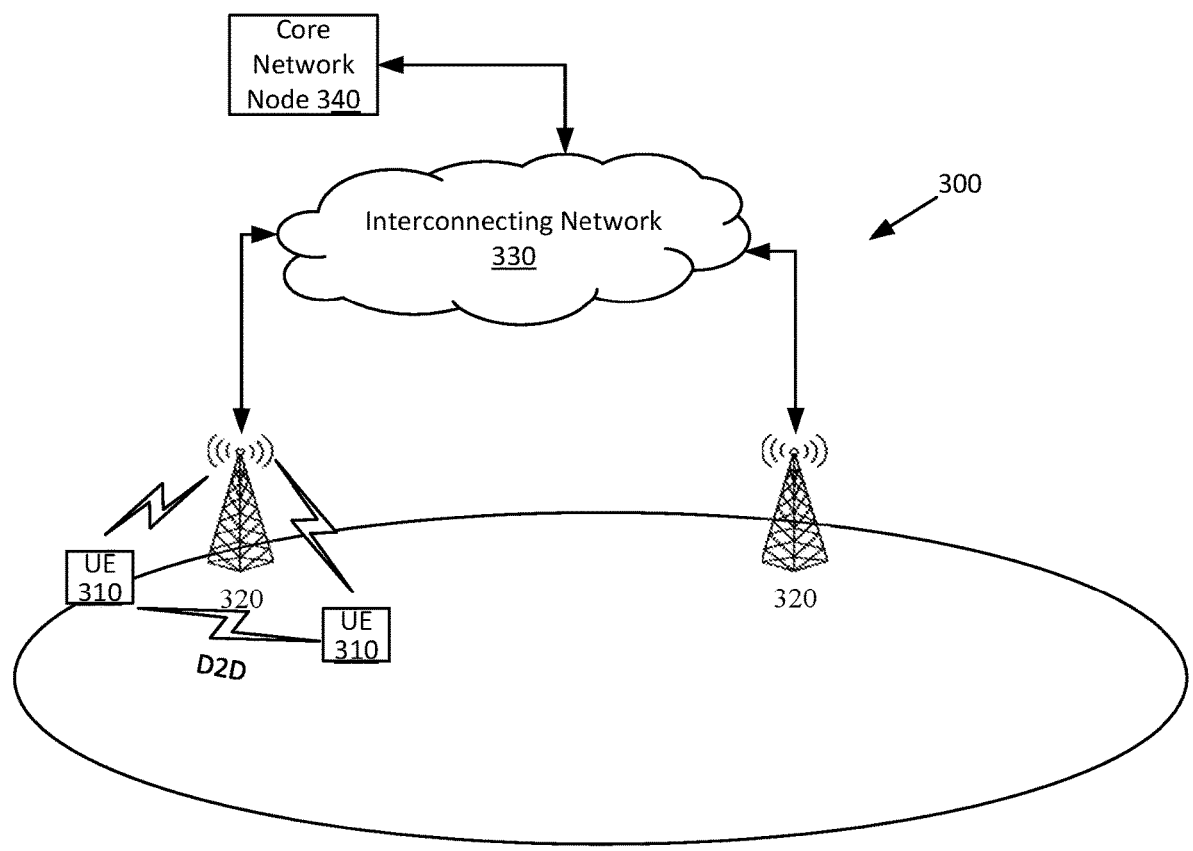
FIG. 16 illustrates one example of a wireless communications system in which embodiments of the present disclosure may be implemented.

FIG. 16 illustrates an example of a wireless network 300 that may be used for wireless communications. Wireless network 300 includes UEs 310 and a plurality of radio network nodes 320 (e.g., Node Bs (NBs) Radio Network Controllers (RNCs), evolved NBs (eNBs), next generation NB (gNBs), etc.) directly or indirectly connected to a core network 330 which may comprise various core network nodes. The network 300 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 310 may be capable of communicating directly with radio network nodes 320 over a wireless interface. In certain embodiments, UEs may also be capable of communicating with each other via device-to-device (D2D) communication. In certain embodiments, network nodes 320 may also be capable of communicating with each other, e.g. via an interface (e.g. X2 in LTE or other suitable interface).

As an example, UE 310 may communicate with radio network node 320 over a wireless interface. That is, UE 310 may transmit wireless signals to and/or receive wireless signals from radio network node 320. The wireless signals may contain voice traffic, data traffic, control signals, and/or any other suitable information. In some embodiments, an area of wireless signal coverage associated with a radio network node 320 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment. The network node 320 may be an IAB node, a child IAB node, a parent IAB node or an IAB donor. Furthermore, the IAB node 320 nay have components as a MT and/or DU.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O & M, OSS, SON, positioning node (e.g. E-SMLC), MDT node, etc. Wireless devices 110 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 16 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc. The network 300 (with the wireless devices 310 and network nodes 320) may be able to operate in LAA or unlicensed spectrum.

Figure 17:
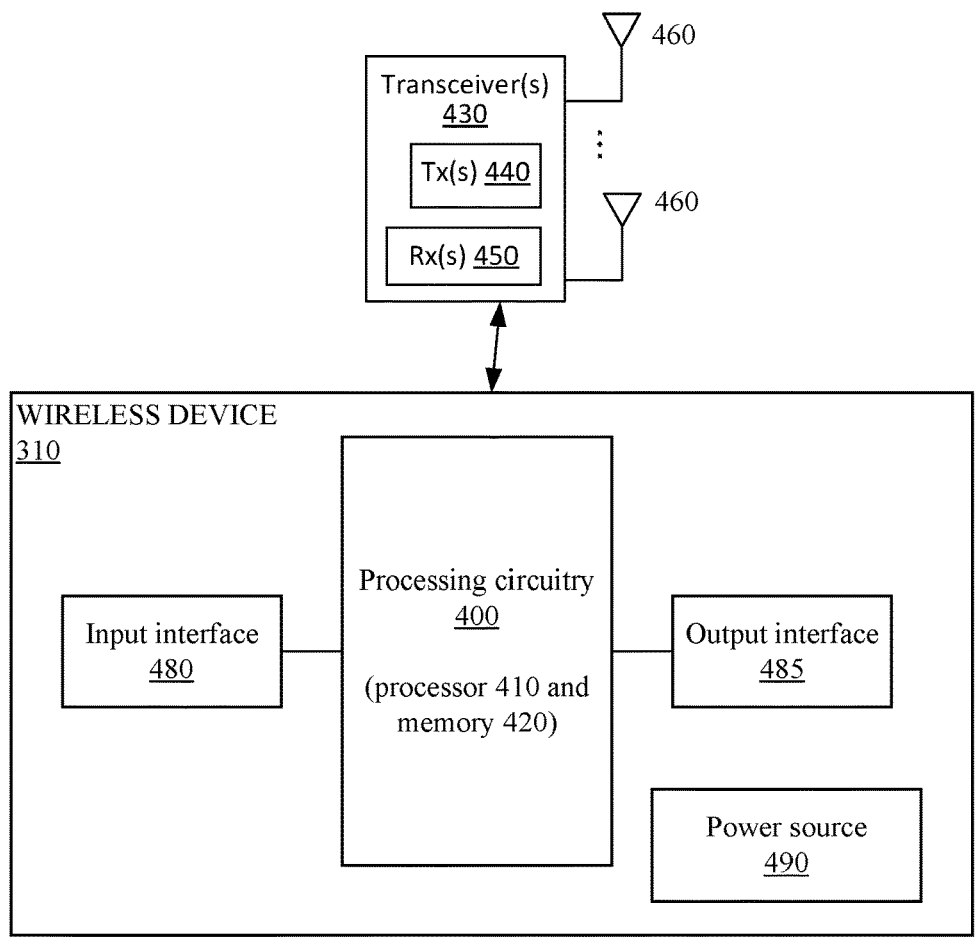
FIG. 17 is a block diagram that illustrates a wireless device according to some embodiments of the present disclosure.

FIG. 17 is a schematic block diagram of the wireless device 310 according to some embodiments. As illustrated, the wireless device 310 includes circuitry 400 comprising one or more processors 410 (e.g., Central Processing Units (CPUs), Application Specific Integrated Circuits (ASICs), Field Programmable Gate Arrays (FPGAs), and/or the like) and memory 420. The wireless device 310 also includes one or more transceivers 430 each including one or more transmitters 440 and one or more receivers 450 coupled to one or more antennas 460. Furthermore, the processing circuitry 400 may be connected to an input interface 480 and an output interface 485. The input interface 480 and the output interface 485 may be referred to as communication interfaces. The wireless device 310 may further comprise power source 490.

In some embodiments, the functionality of the wireless device 310 described above may be fully or partially implemented in software that is, e.g., stored in the memory 420 and executed by the processor(s) 410. For example, the processor 410 is configured to perform all the functionalities performed by the wireless device 310, such as method 100 of FIG. 14.

In some embodiments, a computer program including instructions which, when executed by the at least one processor 410, causes the at least one processor 410 to carry out the functionality of the wireless device 310 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 18:
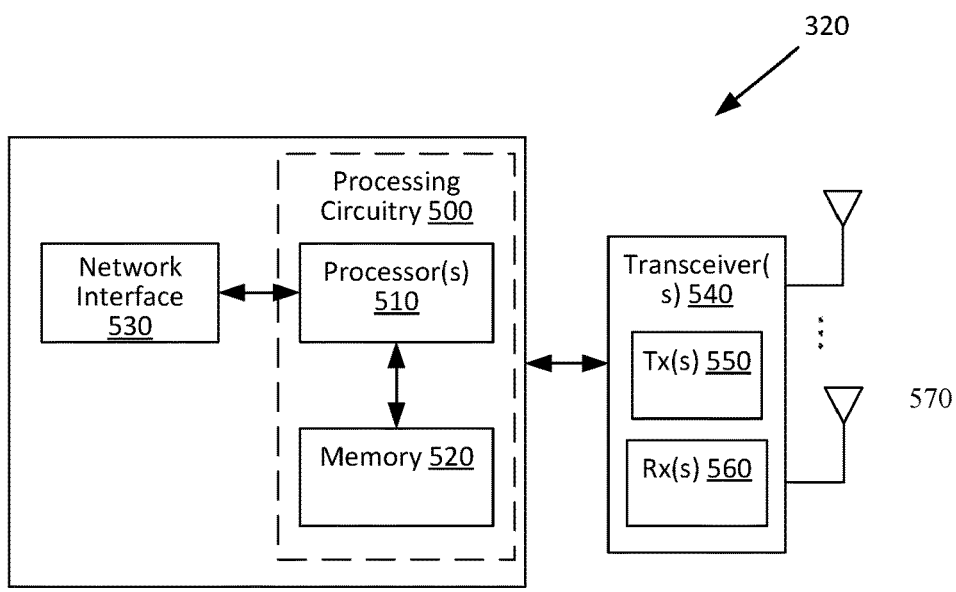
FIG. 18 is a block diagram that illustrates a network node according to some embodiments of the present disclosure.

FIG. 18 is a schematic block diagram of a network node 320 according to some embodiments of the present disclosure. As illustrated, the network node 320 includes a processing circuitry 500 comprising one or more processors 510 (e.g., CPUs, ASICs, FPGAs, and/or the like) and memory 520. The network node also comprises a network interface 530. The network node 320 also includes one or more transceivers 540 that each include one or more transmitters 550 and one or more receivers 560 coupled to one or more antennas 570. In some embodiments, the functionality of the network node 320 described above may be fully or partially implemented in software that is, e.g., stored in the memory 520 and executed by the processor(s) 510. For example, the processor 510 can be configured to perform any steps of the method 200 of FIG. 15.

Figure 19:
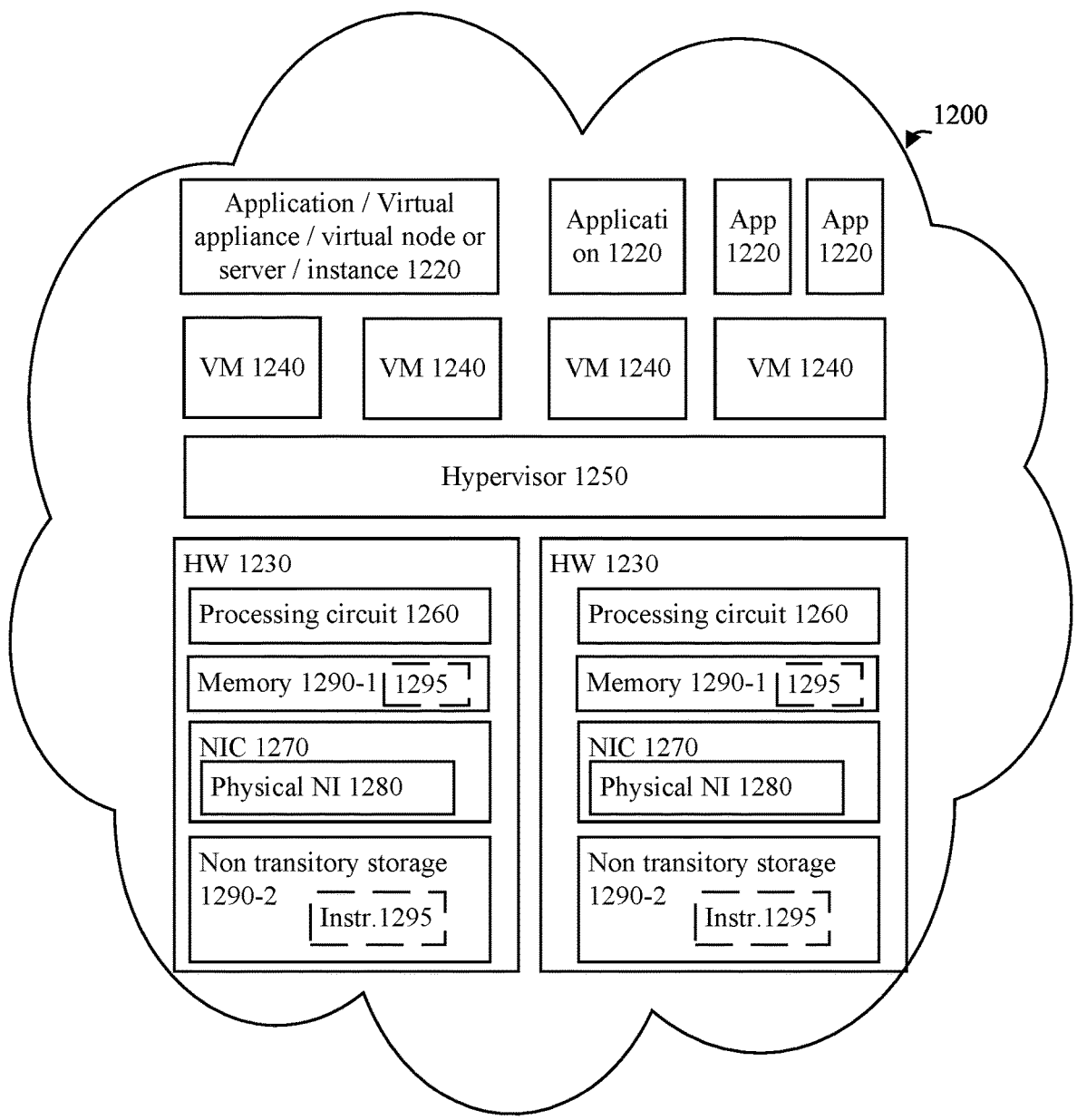
FIG. 19 illustrates a virtualized environment of a network node, according to some embodiments of the present disclosure.

FIG. 19 is a schematic block diagram that illustrates a virtualized embodiment of the wireless device 310 or network node 320, according to some embodiments of the present disclosure. As used herein, a "virtualized" node 1200 is a network node 320 or wireless device 310 in which at least a portion of the functionality of the network node 320 or wireless device 310 is implemented as a virtual component (e.g., via a virtual machine(s) executing on a physical processing node(s) in a network(s)). For example, in FIG. 19, there is provided an instance or a virtual appliance 1220 implementing the methods or parts of the methods of some embodiments. The one or more instance(s) runs in a cloud computing environment 1200. The cloud computing environment provides processing circuits 1230 and memory 1290-1 for the one or more instance(s) or virtual applications 1220. The memory 1290-1 contains instructions 1295 executable by the processing circuit 1260 whereby the instance 1220 is operative to execute the methods or part of the methods described herein in relation to some embodiments.

The cloud computing environment 1200 comprises one or more general-purpose network devices including hardware 1230 comprising a set of one or more processor(s) or processing circuits 1260, which may be commercial off-the-shelf (COTS) processors, dedicated Application Specific Integrated Circuits (ASICs), or any other type of processing circuit including digital or analog hardware components or special purpose processors, and network interface controller(s) (NICs) 1270, also known as network interface cards, which include physical Network Interface 1280. The general-purpose network device also includes non-transitory machine readable storage media 1290-2 having stored therein software and/or instructions 1295 executable by the processor 1260. During operation, the processor(s)/processing circuits 1260 execute the software/instructions 1295 to instantiate a hypervisor 1250 (referred to as a virtual machine monitor (VMM)), and one or more virtual machines 1240 that are run by the hypervisor 1250.

A virtual machine 1240 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1240, and that part of the hardware 1230 that executes that virtual machine 1240, be it hardware 1230 dedicated to that virtual machine 1240 and/or time slices of hardware 1230 temporally shared by that virtual machine 1240 with others of the virtual machine(s) 1240, forms a separate virtual network element(s) (VNE).

The hypervisor 1250 may present a virtual operating platform that appears like networking hardware to virtual machine 1240, and the virtual machine 1240 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1220 may be implemented on one or more of the virtual machine(s) 1240, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium, memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method, in a wireless device, for transmitting a reference signal, the method comprising:
   receiving a configuration via Radio Resource Control (RRC) from a network node, the configuration comprising a list of slot offset values configured for a Sounding Reference Signal (SRS) resource set;
   receiving Downlink Control Information (DCI) triggering the SRS resource set, wherein the DCI contains a slot offset bitfield for indicating one of the slot offset values in the list of slot offset values, wherein each entry of the list of slot offset values corresponds to a codepoint of the slot offset bitfield and wherein a size of the slot offset bitfield changes with a number of slot offset values in the list of slot offset values and the size of the slot offset bitfield is equal to zero if a single slot offset value is configured in the list of slot offset values and wherein the size of the slot offset bitfield is ceil($\log_2(t_{max})$), where $t_{max}$ is the maximum number of offset values in the configured list of slot offset values; and
   transmitting a reference signal using SRS resources configured in the triggered SRS resource set based on the indicated slot offset value.

2. The method of claim 1, wherein a codepoint 0 of the slot offset bitfield indicates a first slot offset value of the list of slot offset values.

3. The method of claim 1, wherein a codepoint 1 of the slot offset bitfield indicates a second slot offset value of the list of slot offset values.

4. The method of claim 1, wherein a codepoint 2 of the slot offset bitfield indicates a third slot offset value of the list of slot offset values.

5. The method of claim 1, wherein a codepoint 3 of the slot offset bitfield indicates a fourth slot offset value of the list of slot offset values.

6. The method of claim 1, further comprising receiving a Medium Access Control (MAC) Control Element (CE) for updating a slot offset value indicated by the slot offset bitfield in the DCI.

7. The method of claim 6, further comprising, upon receipt of the MAC CE, determining an updated slot offset value associated with a codepoint of the slot offset bitfield of the DCI.

8. The method of claim 7, wherein determining an updated slot offset value comprises obtaining the updated slot offset value from the MAC CE, the updated slot offset value associated with the codepoint of the slot offset bitfield of the DCI.

9. The method of claim 7, wherein determining an updated slot offset value comprises obtaining the updated slot offset value from the MAC CE, the updated slot offset value associated with the codepoint of the slot offset bitfield of the DCI based on a position of a field comprising the updated offset value within the MAC CE.

10. A method, in a network node, for receiving a reference signal, the method comprising:
sending a configuration via Radio Resource Control (RRC) to a wireless device, the configuration comprising a list of slot offset values, configured for a Sounding Reference Signal (SRS) resource set;
sending Downlink Control Information (DCI) triggering the SRS resource set, wherein the DCI contains a slot offset bitfield for indicating one of the slot offset values in the list of slot offset values, wherein each entry of the list of slot offset values corresponds to a codepoint of the slot offset bitfield and wherein a size of the slot offset bitfield changes with a number of slot offset values in the list of slot offset values and the size of the slot offset bitfield is equal to zero if a single slot offset value is configured in the list of slot offset values, and wherein the size of the slot offset bitfield is ceil($\log_2(t_{max})$), where $t_{max}$ is the maximum number of offset values in the configured list of slot offset values; and
receiving a reference signal using SRS resources configured in the triggered SRS resource set based on the indicated slot offset value.

11. The method of claim 10, wherein a codepoint 0 of the slot offset bitfield indicates a first slot offset value of the list of slot offset values.

12. The method of claim 10, wherein a codepoint 1 of the slot offset bitfield indicates a second slot offset value of the list of slot offset values.

13. The method of claim 10, wherein a codepoint 2 of the slot offset bitfield indicates a third slot offset value of the list of slot offset values.

14. The method of claim 10, wherein a codepoint 3 of the slot offset bitfield indicates a fourth slot offset value of the list of slot offset values.

15. The method of claim 10, further comprising sending a Medium Access Control (MAC) Control Element (CE) for updating a slot offset value indicated by the slot offset bitfield in the DCI.

16. A wireless device comprising a communication interface and processing circuitry connected thereto and configured to:
receive a configuration via Radio Resource Control (RRC) from a network node, the configuration comprising a list of slot offset values configured for a Sounding Reference Signal (SRS) resource set;
receive Downlink Control Information (DCI) triggering the SRS resource set, wherein the DCI contains a slot offset bitfield for indicating one of the slot offset values in the list of slot offset values, wherein each entry of the list of slot offset values corresponds to a codepoint of the slot offset bitfield and wherein a size of the slot offset bitfield changes with a number of slot offset values in the list of slot offset values and the size of the slot offset bitfield is equal to zero if a single slot offset value is configured in the list of slot offset values, and wherein the size of the slot offset bitfield is ceil($\log_2(t_{max})$), where $t_{max}$ is the maximum number of offset values in the configured list of slot offset values; and
transmit a reference signal using SRS resources configured in the triggered SRS resource set based on the indicated slot offset value.

17. The wireless device of claim 16, wherein the processing circuitry is further configured to receive a Medium Access Control (MAC) Control Element (CE) for updating a slot offset value indicated by the slot offset bitfield in the DCI.

* * * * *